S. BROWN.
DIRECT VIEW FINDER FOR FOLDING CAMERAS.
APPLICATION FILED JAN. 20, 1915.
1,151,564.   Patented Aug. 31, 1915.
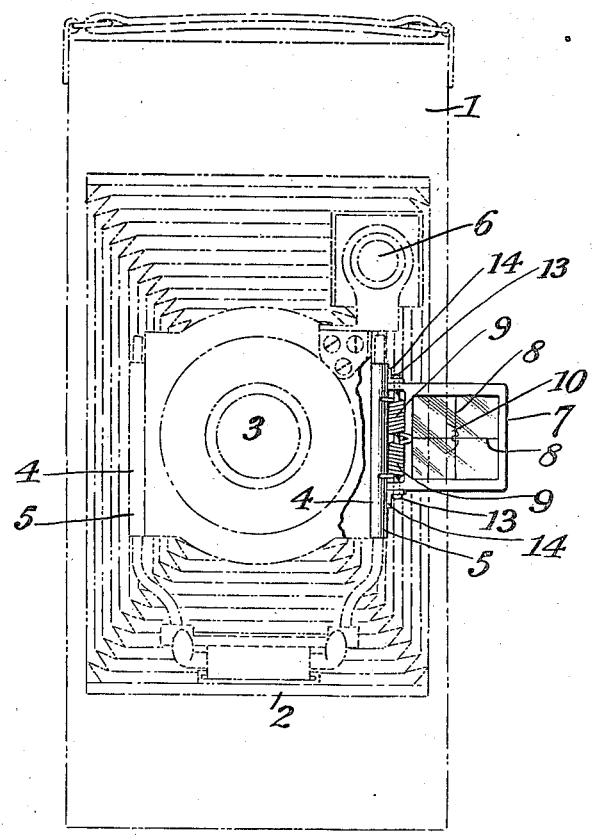
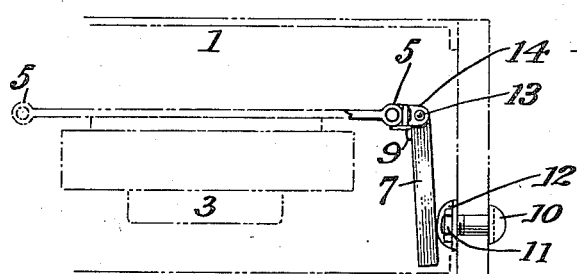

UNITED STATES PATENT OFFICE.

STANLEY BROWN, OF GARDEN CITY, NEW YORK.

DIRECT-VIEW FINDER FOR FOLDING CAMERAS.

1,151,564.   Specification of Letters Patent.   Patented Aug. 31, 1915.

Application filed January 20, 1915. Serial No. 3,216.

*To all whom it may concern:*

Be it known that I, STANLEY BROWN, a citizen of the United States, and a resident of the city of Garden City, county of Nassau, and State of New York, have invented certain new and useful Improvements in Direct-View Finders for Folding Cameras, of which the following is a specification.

It is the purpose of this invention to provide folding cameras with a direct view finder so constructed that it shall be automatic in operation, compact in form and inexpensive in construction, and to this end the screen of the finder is pivoted to the lens casing, or lens supporting frame and preferably provided with a spring, the whole being so arranged that when the bellows of the camera are projected, the finder screen will automatically assume its proper position for use and when folded back within the camera casing, the screen will come in contact with some fixed part of the structure and be automatically closed so as to pass smoothly within the casing. The sight member of the finder will be placed upon some suitable fixed part of the camera casing.

The invention involves other features which will be hereinafter described.

Referring to the drawings, Figure 1 is a front view of a folding camera showing the bellows projected and the screen of the direct view finder in its projected position; Fig. 2 is a plan view, all the parts being shown diagrammatically except the finder screen which is illustrated in its folded position within the camera casing.

In the drawings 1 represents the camera case, 2 the drop front, 3 the lens, 4 the tubular sliding members of the lens casing, which are adapted to vertical adjustment upon the uprights 5.

6 is an ordinary mirror finder, 7 the direct view finder frame which supports the usual reducing lens or image glass having crossing wires, lines or markings 8, or their equivalent, which determine the axis of the finder.

9 is a spring the normal action of which is to project the frame 7.

10 is a screw which passes through the side of the camera and is provided on its interior with a nut 11 which confines a suitable smooth knob or rounded washer 12.

13 is a pivot or axis upon which the frame 7 swings. It is supported by upper and lower brackets 14. It will be noted that the brackets 14 are soldered or otherwise fastened to the sliding tubes 4 which form part of the lens frame and rise and fall with the lens, that the frame of the direct view finder is pivoted to the pivot pin 13 which is supported by these brackets, that the spring 9 normally tends to project the screen frame and that the slot of the screw 10 is so adjusted as to be in exact alinement with the axis of the finder frame 7. These parts being thus constructed and assembled, the operation is obvious.

When the camera is closed, the bellows, lens, etc., being in their retracted position, then the finder frame 7 is in contact with the smooth, rounded knob or stud 12 and is folded against the stress of the spring 9 by the side of the bellows within the camera casing. When, however, the drop front is lowered and the lens and bellows pulled forwardly, then the finder frame 7 comes forwardly with the lens structure and as it moves outwardly, the spring 9 will automatically and smoothly cause the finder frame 7 to swing outwardly, so that when it has passed the forward edge of the side of the camera casing, it will attain the rectangular position shown in Fig. 1. When the camera has been adjusted for exposure and the photographer desires to use the direct view finder, he uses the saw kerf or slot in the head of the screw 10 as the sight, bringing it into registration with the axial center of the frame 7 as shown by the crossing lines or wires 8 in the usual way.

Upon closing the camera the operator need pay no attention to the frame 7 because when the lens and bellows are pressed backwardly into the camera casing, the frame 7 will come in contact with the smooth, rounded surface of the stud or knob 12 and be automatically closed against the stress of the spring 9 and pass smoothly within the camera casing without any attention on the part of the operator. Ordinarily the frame 7 in a direct view finder is provided with a reducing lens in connection with the crossing wires or lines 8, but if as is sometimes the case, no lens is used, the frame being left open and with or without the crossing wires, or equivalent, then the smooth stud or knob 12 should be so located as to engage with the upper or lower cross bars of the frame 7.

It will of course be understood that any

"sight" other than the screw head with saw kerf may be employed, as, for example, the head of a small brass tack or rivet or any equivalent fixed device or point adapted to act as the rear sight of the finder.

By this invention I secure two important advantages over other styles of direct view finders for folding cameras; first, the finder screen, since it is attached to the lens casing or frame, will inevitably move with it and to the same degree as it, and this secures desirable results because the film, plate or other sensitive surface and the sight will be stationary on the casing of the camera, but the lens and finder will move harmoniously and consequently any divergence from the horizontal necessary to properly find the subject in the finder, will result in identically the same divergence in the lens, so that the picture will be properly produced upon the sensitive surface; and second, the locating of the screen at the lens of the camera, will enable the photographer to obtain the correct view or image while holding the camera relatively close to his eye. This is a marked advantage in gaging the distance for close range photography. Another advantage is that this form of direct view finder in no wise conflicts with the employment of the ordinary mirror form of finder, as is obvious from an inspection of Fig. 1, wherein such mirror finder is also shown in its usual position adapted to its usual operation.

It will of course be understood that the camera may and preferably should be furnished with the usual level and provision for shifting the lens vertically and horizontally and with indices to indicate the degree of such movement.

The construction described and illustrated by me is one form only in which the invention may be embodied and it will be readily understood by those who are familiar with such matters that the details of construction may be departed from and yet the essentials of the invention be retained. I therefore do not limit myself to such details.

I claim:

1. In a folding camera a lens-carrying device, a direct view finder embodying a sight upon the camera and a finder frame pivotally supported upon the lens-carrying device so as to swing inwardly toward the axis of the camera and outwardly away therefrom.

2. In a folding camera having a lens and bellows, a direct view finder embodying a sight upon the camera, a finder frame pivotally supported upon suitable journals near the lens in such manner as to swing inwardly toward the axis of the camera and outwardly away therefrom, and a spring adapted to automatically project the finder frame when the bellows are extended.

3. In a folding camera a direct view finder embodying a sight upon the camera, movable lens-supporting devices, and a finder frame pivotally supported by suitable journals upon the lens-supporting devices and moving therewith and adapted to swing inwardly toward the optical axis of the camera and outwardly away therefrom.

4. In a folding camera a direct view finder embodying a sight upon the camera, movable lens-supporting devices, a finder frame pivotally supported by suitable journals upon the lens-supporting devices and moving therewith and adapted to swing inwardly toward the optical axis of the camera and outwardly away therefrom, and a spring adapted to automatically project the finder frame when the bellows are extended.

In testimony whereof I have signed my name to this specification in the presence of two subscribing witnesses.

STANLEY BROWN.

Witnesses:
T. M. DONSBACH,
CORNELIUS P. MCLAUGHLIN.